(12) United States Patent
Sarconi

(10) Patent No.: US 6,881,066 B1
(45) Date of Patent: Apr. 19, 2005

(54) PHRASE-COMPOSING DEVICE FEATURING INTERLOCKING COLLARS AND GAPS EXPOSING CONTENT AREAS ON A COMMON SHAFT

(76) Inventor: Matthew Steven Sarconi, 204 Anderson St., San Francisco, CA (US) 94110

( * ) Notice: Subject to any disclaimer, the term of this patent is extended or adjusted under 35 U.S.C. 154(b) by 102 days.

(21) Appl. No.: 10/745,048

(22) Filed: Dec. 22, 2003

(51) Int. Cl.[7] .................................................. G09B 1/18
(52) U.S. Cl. ................................. 434/174; 273/153 S
(58) Field of Search ................................ 434/160, 161, 434/167, 171–176, 197–199, 404, 405

(56) References Cited

U.S. PATENT DOCUMENTS

| | | | |
|---|---|---|---|
| 463,230 A | 11/1891 | Hooly | |
| 924,406 A | * 6/1909 | Walker | 235/61 B |
| 2,411,717 A | 11/1946 | Fay et al. | |
| 2,476,580 A | 7/1949 | Bergman | |
| 2,608,006 A | 8/1952 | Mulvihill | |
| 2,795,862 A | * 6/1957 | Poole | 434/197 |
| 3,407,514 A | 10/1968 | Christian | |
| 3,574,957 A | * 4/1971 | Bello-Bridick | 434/173 |
| 3,603,593 A | 9/1971 | Chew | |
| 3,674,905 A | 7/1972 | Collins, Sr. | |
| 3,717,942 A | 2/1973 | Presby | |
| 3,873,096 A | 3/1975 | Shoptaugh | |
| 3,913,246 A | * 10/1975 | Wahlberg et al. | 434/309 |
| 3,947,036 A | * 3/1976 | Kupec | 273/272 |
| 3,970,315 A | 7/1976 | Redner | |
| 4,021,940 A | * 5/1977 | Saint | 434/348 |
| 4,043,057 A | * 8/1977 | Guswiler | 434/198 |
| 4,146,978 A | 4/1979 | Breslow | |
| 4,295,832 A | 10/1981 | Karell | |
| 4,651,992 A | 3/1987 | Danino et al. | |
| 4,714,429 A | * 12/1987 | Phillips | 434/198 |
| 4,779,870 A | 10/1988 | Nichols | |
| 4,865,324 A | 9/1989 | Nesis | |
| 4,902,230 A | 2/1990 | Jones | |
| 4,949,969 A | 8/1990 | Johnson | |
| 5,007,840 A | 4/1991 | Gaskell | |
| 5,074,561 A | 12/1991 | Johnson | |
| 5,150,900 A | 9/1992 | Onzo | |
| 5,516,289 A | 5/1996 | Quigley et al. | |
| 6,095,818 A | * 8/2000 | Brazley | 434/173 |
| 6,142,784 A | 11/2000 | Wood | |
| 6,358,059 B1 | * 3/2002 | Li | 434/402 |
| 6,460,849 B1 | 10/2002 | Bean | |
| 6,638,072 B1 | * 10/2003 | Sarconi | 434/174 |

* cited by examiner

Primary Examiner—Kurt Fernstrom
(74) Attorney, Agent, or Firm—Mark J. Spolyar

(57) ABSTRACT

An amusement or educational device comprising a plurality of interlocking collars, each including gaps, and slidable along and rotatable about a common shaft. The common shaft bears element of a multi-relationship about its circumference in sections of the shaft corresponding to each interlocking collar. The gaps in the interlocking collars selectively expose corresponding elements of the multi-element relationship. In one embodiment, the collars are configured to allow users to construct fortunes, words, sentences, equations, or other relationships by selectively interlocking adjacent collars to expose word, mathematical, sentence or other appropriate elements disposed around the shaft.

27 Claims, 3 Drawing Sheets

| Column 1 | Column 2 | Column 3 | Column 4 |
|---|---|---|---|
| Trust your gut | and live for today. | The time is near to | see the big picture. |
| Regain control | and embrace change. | Wait another day to | head for the hills. |
| Open your eyes | and consider plan B. | Be prepared to | throw a hissy fit. |
| Speak your mind | and thank your stars. | Do not attempt to | reward yourself. |
| Drop your guard | and don't look back. | Seize the chance to | ask for help. |
| Follow your heart | and bend the rules. | The time is right to | start anew. |
| Test a theory | and face a fear. | It's not too late to | spread some gossip. |
| Lead by example | and share a secret. | It is best not to | burn a bridge. |
| Call an old friend | and shake things up. | Now is the time to | forgive someone. |
| Know your limits | and switch parties. | Wait until Friday to | pursue a dream. |
| Question authority | and seek adventure. | Fight the urge to | seek a higher power. |
| Think for yourself | and lie a teeny bit. | The time will pass to | share the wealth. |
| Plan your escape | and say you're sorry. | It is not yet time to | take the low road. |
| Use your strengths | and relive the past. | Do not hesitate to | blame someone else. |
| Get off the fence | and be direct. | It might be best to | take a big leap. |

Fig. 3

PHRASE-COMPOSING DEVICE FEATURING INTERLOCKING COLLARS AND GAPS EXPOSING CONTENT AREAS ON A COMMON SHAFT

CROSS-REFERENCE TO RELATED PATENTS

This application makes reference to the following commonly owned U.S. patent applications and/or patents, which is incorporated herein by reference in its entirety for all purposes:

U.S. patent application Ser. No. 10/290,680, now U.S. Pat. No. 6,638,072, in the name of Matthew Steven Sarconi, entitled "Phrase-Composing Device Featuring Interlocking Collars."

FIELD OF THE INVENTION

The present invention relates to amusement or educational devices allowing users to build various relationships by selecting from a set of predefined elements and, more particularly, to a hand-held, phrase-composing device allowing users to construct fortunes, words, sentences, mathematical equations, or other relationships by selectively interlocking adjacent collars having gaps to expose word, mathematical, sentence or other appropriate elements disposed around the shaft about which the collars rotate and selectively interlock.

BACKGROUND OF THE INVENTION

Educational and amusement devices including rotatable elements that allow users to construct words, sentences, mathematical equations and other relationships are known. For example, U.S. Pat. No. 2,411,717 issued to Fay et al. teaches an educational device comprising a plurality of adjacent, straight-edged rings disposed around a cylinder. Each ring includes letters disposed around its circumference. A user can adjust the rings relative to one another to spell words. In addition, U.S. Pat. No. 2,476,850 issued to Bergman describes an educational device comprising rotatable elements, each including elements of mathematical equations, to facilitate learning of basic arithmetic operations. U.S. Pat. No. 2,608,006 issued to Mulvihill discloses an educational toy comprising a cylinder and a rotatable cap disposed around the end of the cylinder. The cylinder and the cap have juxtaposed letters or numbers which may be aligned to form words or numbers. Similarly, U.S. Pat. No. 4,146,978 issued to Breslow teaches an amusement device facilitating spelling education comprising rotatable, letter-bearing elements disposed around a common shaft. U.S. Pat. No. 4,651,992 issued to Danino et al. provides a puzzle-type game comprising a plurality of shapes rotatably attached to one another in a series, wherein each shape includes indicia representing elements of a multi-element relationship. To solve the puzzle, the user rotates the shapes relative to one another until all indicia, when aligned, express a valid multi-element relationship.

Fortune telling games and devices are also known. Many prior art fortune telling devices rely on the user to ask a specific question, to roll dice, and/or to draw a card from a stack. For example, prior art fortune telling devices include the well-known eight-ball including a multi-faceted die visible through an opening in the eight-ball. The die includes small fortunes on each face of the die that appear after the user shakes the device. The fortunes that result are usually limited to a small handful of short responses that are often quite vague and require the user to interpret or apply the message to his or her situation. The interaction required to elicit the fortune leaves little room for imagination or variety, or much sense of interactive input and self-determination. In addition, U.S. Pat. No. 3,970,315 issued to Redner teaches a fortune telling game comprising a game board including written intelligence and indexing cards that determine the resulting fortunes that users may interpret.

In addition, U.S. Pat. No. 6,638,072, incorporated by reference above, discloses a phrase-composing device having inter-locking collars disposed around a shaft. The collars include elements of a multi-element relationship. The user rotates each collar and aligns the elements of one collar relative to an adjacent collar to create the multi-element relationship. The device can be used as a fortune-telling or education device. With some application, such as fortune-telling devices, it is sometimes desirable to individually expose the possible elements of potential multi-element relationships. While the foregoing phrase composing device fulfills its objective, however, the inclusion of text or other elements of a multi-element relationship allows the user to quickly scan, and become familiar with, all of the elements disposed on the individual collars.

While the amusement and educational devices discussed above fulfill their respective objectives, the prior art does not disclose or suggest a phrase-composing device including interlocking collars having gaps to allow users to construct fortunes, words, sentences, equations, or other relationships by selectively interlocking adjacent collars in various possible positions to expose word, equation, or sentence elements disposed around the shaft about which the interlocking collars rotate.

SUMMARY OF THE INVENTION

The present invention provides an amusement or educational device comprising a plurality of interlocking collars, each including gaps, and slidable along and rotatable about a common shaft. The common shaft bears elements of a multi-element relationship about its circumference in sections of the shaft corresponding to each interlocking collar. The gaps in the interlocking collars selectively expose corresponding elements of the multi-element relationship. In one embodiment, the collars are configured to allow users to construct fortunes, words, sentences, equations, or other relationships by selectively interlocking adjacent collars to expose word, mathematical, sentence or other appropriate elements disposed around the shaft. In one embodiment, the present invention provides a fortune-telling or entertainment device allowing users to compose fortunes or other relationships by selectively combining multi-word sentence fragments disposed around the circumference of shaft.

DESCRIPTION OF THE DRAWINGS

FIG. 3 is a table setting forth sentence fragments disposed around the circumference of the shaft according to an embodiment of the present invention.

DESCRIPTION OF PREFERRED EMBODIMENT(S)

Figure 1A:
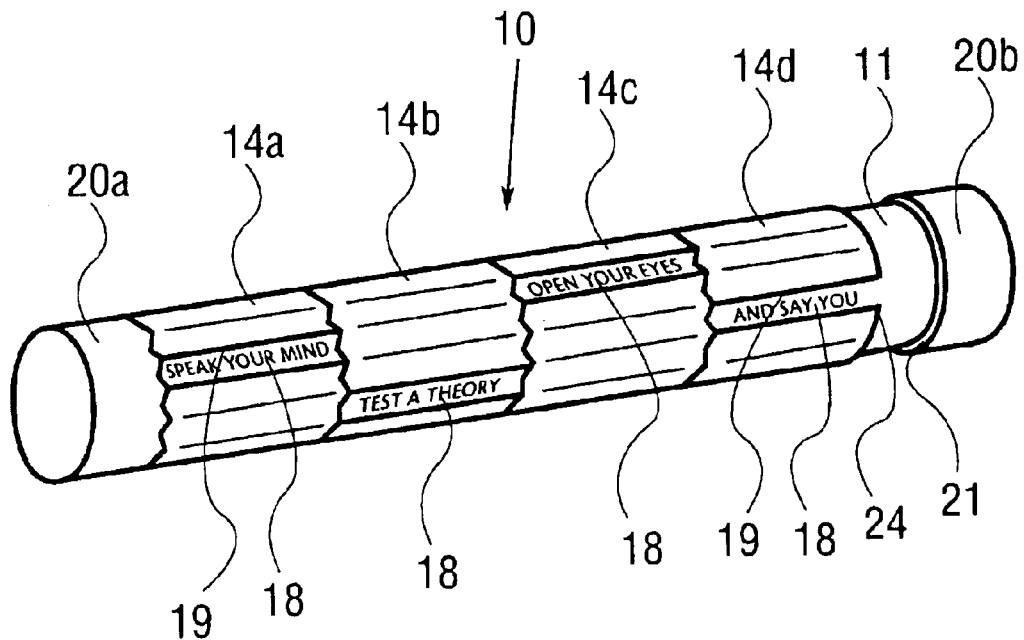
FIG. 1A provides a perspective view of the phrase-composing device, according to an embodiment of the present invention, wherein the collars are interlocked in a fixed orientation.
Figure 1B:
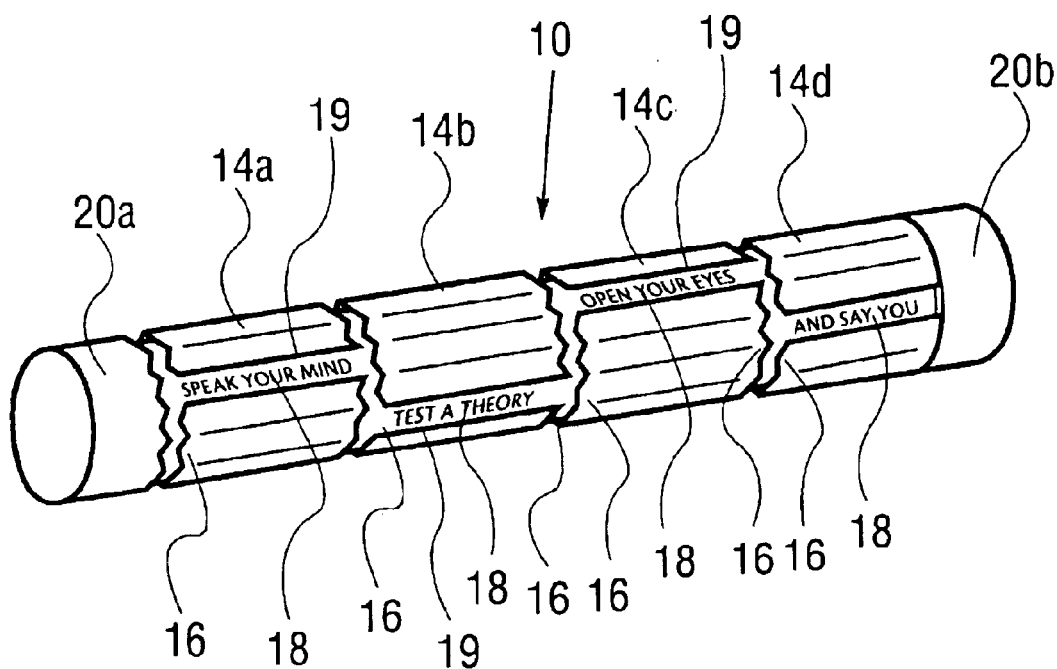
FIG. 1B is a perspective view of the phrase-composing device, according to an embodiment of the present invention, showing the collars in an independently rotatable orientation.
Figure 2:
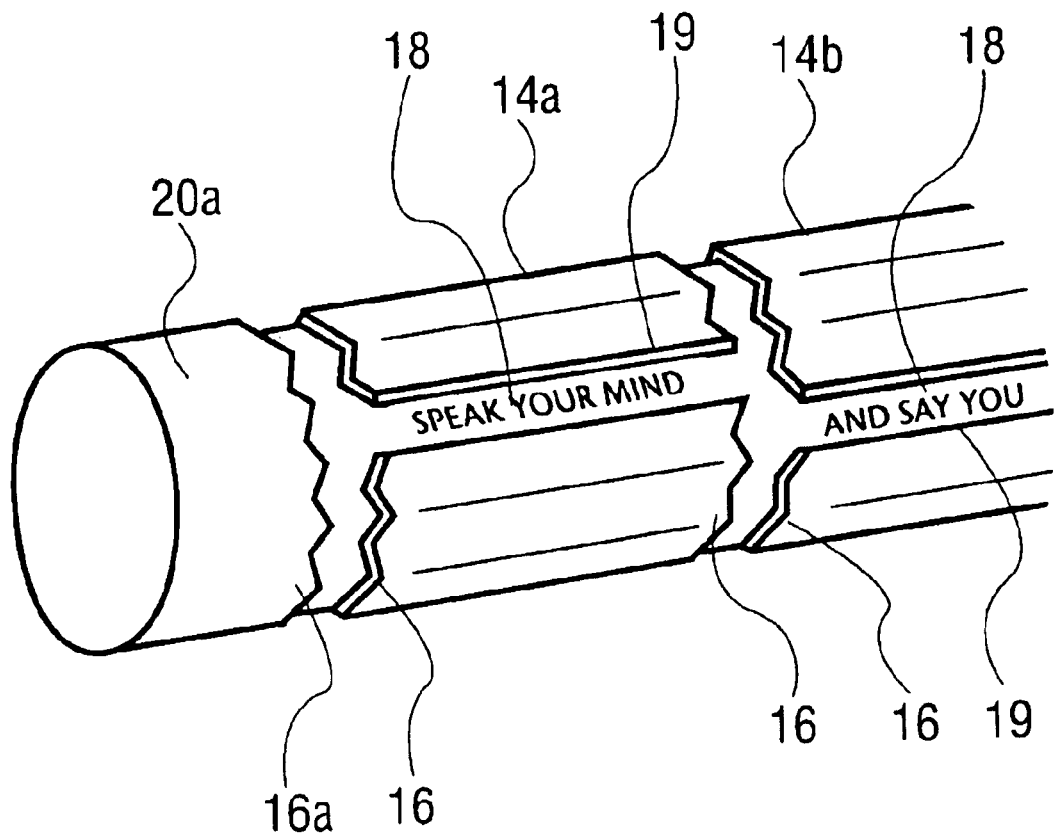
FIG. 2 is an enlarged sectional perspective view of the phrase composing device according to an embodiment of the present invention, illustrating how the elements disposed on the shaft are viewable through the gaps in the interlocking collars.

FIGS. 1A and 1B set forth a phrase-composing device according to an embodiment of the present invention. As FIG. 1A illustrates, the phrase-composing device 10 comprises a shaft 11 and a plurality of interlocking collars 14a, 14b, 14c and 14d slidably disposed around the shaft 11. In one embodiment, phrase-composing device 10 further includes first end cap 20a and second end cap 20b that together retain the interlocking collars 14a, 14b, 14c and 14d on the shaft 11. As FIG. 2 illustrates, the first end cap 20a includes a plurality of teeth 16a extending from the inner edge of the first end cap 20a. As FIG. 1A shows, the second end cap 20b, in one embodiment, is disposed over the opposite end of the shaft 11 and includes a straight or smooth edge 21.

As the FIGURES illustrate, the interlocking collars 14a, 14b, and 14c have interlocking edges, in one embodiment, comprising a plurality of teeth 16 extending from opposite edges, while the right-most collar 14d includes one set of teeth opposing the teeth extending from the right edge of collar 14c. In one embodiment, the opposite edge 24 of collar 14d has a straight profile featuring no teeth to allow collar 14d to be positioned against the second end cap 20b and nevertheless rotate as desired. In addition, each interlocking collar 14a, 14b, 14c and 14d includes a gap 19 that exposes, in one embodiment, sentence fragments disposed around sections of the shaft 11 corresponding to each interlocking collar. Of course, the shaft can include any element from any type of multi-element relationship, such as a mathematical equation, a fortune and the like. The distance between the inner edge of the first end cap 20a and the second end cap 20b is configured to allow users to slide the interlocking collars along the shaft 11 and independently rotate each collar relative to the shaft 11. Specifically, as FIG. 2 shows, the distance between the first end cap 20a and the second end cap 20b allows the user, for example, to slide collars 14b, 14c and 14d to the right against the second end cap 20b to isolate the first collar 14a for independent rotation relative to the first end cap 20a and the remaining collars 14b, 14c and 14d. When the user selects an element disposed on a section of the shaft 11 corresponding to the first collar 14a, he slides the collar 14a against the inner edge of the first end cap 20a to interlock the teeth 16a of the first end cap 20a and the opposing teeth 16 extending from the left edge of the collar 14a to expose the selected element within the region defined by the gap 19 in the interlocking collar. As FIG. 2 illustrates, the gaps 19 generally match the perimeter of the text areas 18 disposed around the shaft 11. The gaps 19 can simply be cutout regions in the interlocking collars, or sections of clear, translucent, or transparent material, that allow a text area 18 to be viewed when the gap 19 overlies it. In addition, the gaps and the teeth of the interlocking collars are configured to allow for selective alignment of the gaps 19 with the text areas 18. Although the various FIGURES illustrate that the gaps 19 extend the entire length of each of the collars 14a–14d, the gaps 19 can be cutout sections or windows, leaving sections of material along the outer edges of the collars 14a–14d and adjacent to the gaps 19.

FIG. 3 is a table setting forth the sentence fragments located within the text areas 18 disposed around the circumference of the sections of the shaft 11 corresponding to the interlocking collars 14a, 14b, 14c and 14d according to an embodiment of the present invention. The sentence fragments, in one embodiment, are designed to be mixed and matched, and, in various combinations across the interlocking collars, form cohesive statements or fortunes. As FIG. 3 illustrates, each section of the shaft 11, in one embodiment, has fifteen (15) different multi-word sentence fragments disposed around their respective circumferences, creating 50,625 possible phrase or sentence combinations. In addition, the table provided by FIG. 3 illustrates only one of many possible combinations of sentence fragments. The sentence fragments set forth in FIG. 3 provide an illustrative embodiment rendering the phrase-composing device 10 suitable for use as a fortune-telling or other entertainment device. One of ordinary skill in the art will recognize that an unlimited variety of sentence fragments can be incorporated into embodiments of the present invention to achieve myriad objectives. In constructing a relationship among the elements disposed about the interlocking collars 14a, 14b, 14c and 14d, the user may actively select each element to construct a desired relationship such as a sentence or fortune. Alternatively, the user may elect to randomly select or manipulate the collars to create fortunes or other relationships, as opposed to specifically selecting and exposing elements across the collars to create relationships.

The text areas 18 located on the sections of the shaft 11 can include a variety of different elements. As the FIGURES illustrate, in one embodiment, each text area 18 can include a sentence fragment, which in combination with other sentence fragments on adjacent sections of the shaft, form sentences, fortunes or other relationships. The text areas 18, however, can be configured to include any suitable element of a multi-element relationship (e.g., letters, numbers, symbols, sentence fragments, clauses, graphics, illustrations, etc.) that, in combination with other elements on adjacent shaft sections, form a relationship (e.g., a word, sentence, fortune, equation, etc.). Of course, one skilled in the art will recognize that the interlocking collars and the shaft of the present invention can be configured to include fewer or more text areas 18. In one embodiment, lines (not shown) can demarcate text areas 18. In another embodiment, text areas are demarcated or indicated by differently colored regions. In one embodiment, text areas 18 are blank (demarcated by lines or other suitable indicia) allowing the user to apply sentence fragments or other elements in the text areas as the user desires to create a custom phrase-composing device.

As the various FIGURES illustrate, the teeth 16 extending from the interlocking collars 14a, 14b, 14c and 14d are arranged in a saw-tooth configuration and, individually, are triangular in profile. In this arrangement, the number of teeth extending from each of the interlocking collars 14a, 14b, 14c and 14d corresponds to the number of text areas 18 on each section of the shaft. As one skilled in the art will recognize, however, the opposing edges of adjacent collars may comprise any suitable shape that allows the collars to interlock to align the gaps 19 with the text areas 18 in the desired number of positions. For example, the profile of the individual teeth may be semi-circular creating collars having sinusoidal edges. The teeth may also be square or rectangular in profile as well. One skilled in the art will recognize that the profile of the edges of the interlocking collars 14a, 14b, 14c and 14d may be configured to include any suitable interlocking shape.

In use, the user holds the phrase-composing device 10 in his or her left hand substantially at the first end cap 20a. With the right hand, the user slides collars 14a, 14b, 14c and 14d such that the first collar 14a is in an independently rotatable state between the first end cap 20a and the second collar 14b. In this state, the user may rotate the first collar 14a about the shaft 11 and, when a desired element on the shaft section corresponding to collar 14a is exposed, slide the first collar 14a such that the teeth 16 of the first collar 14a and the teeth 16a of the first end cap 20a interlock. Similarly, the user then slides or otherwise manipulates the remaining collars 14b, 14c and 14d, such that the second collar 14b is independently rotatable relative to at least the first collar 14a. In this state, the user may then rotate the second collar 14b in either direction about the shaft 11. Once a desired element on the shaft section corresponding to the second collar is exposed, the user then slides the second collar 14b against the first collar 14a such that their respective teeth interlock and expose the selected elements of the first and second collars 14a, 14b. The user then repeats this process for the remaining collars 14c and 14d. When the last collar 14d is slid against the third collar 14c, the teeth of the first end cap 20a and the interlocking collars 14a, 14b, 14c and 14d cooperate to prevent the collars and hence the selected elements from becoming misaligned. To read the multi-element relationship created by the user, he rotates the device 10 to view each the text exposed by the gaps in the interlocking collars.

As one skilled in the art will recognize, the present invention is capable of being implemented in a variety of different forms. For example, the shaft 11, the first and second end caps 20a and 20b, and the interlocking collars 14a, 14b, 14c and 14d can be made of any suitable material including, but not limited to, cardboard, plastic, metal, wood, and the like. In addition, either or both of first and second end caps 20a and 20b can be permanently fixed to the shaft 11 or removably attached to the shaft 11 to permit the interlocking collars 14a, 14b, 14c and 14d to be used on different shafts having different elements.

Furthermore, the shaft 11 may take a variety of forms. For example, the shaft 11 can be hollow or solid. As the various FIGURES show, the shaft 11, in one embodiment, is cylindrical in overall shape having a circular cross-section. In other embodiments, however, the shaft 11 can be configured to have different cross-sectional shapes, such as an ellipse, a square or rectangle with rounded corners, etc. In such embodiments where the cross-section is non-circular, however, the interlocking collars should comprise a flexible material having a clear area defining the gap 19, such as vinyl or other plastic, to permit the interlocking collars to flex as they rotate about the shaft 11.

Still further, although the embodiments described above are adapted to include sentence fragments disposed around the circumference of the shaft sections, the text areas 18 of the collars can be configured to include a variety of other elements (such as letters, numbers, mathematical operators, symbols, illustrations, graphics, and the like) to allow the phrase-composing device of the present invention to be used to construct other relationships, such as mathematical equations and words.

Lastly, although the present invention has been described with reference to specific embodiments, various other embodiments are possible without departing from the scope of the present invention. For example, color markings or other indicators can be disposed on the individual collars at selected locations. To compose pre-defined multi-element relationships, the user aligns various indicators on each of the collars (e.g., such as the same color) and locks them inyo place. The user then can read the multi-element relationship by rotating the collar to read the elements on the shaft exposed by the gaps in the interlocking collars. In other implementations, the outer edge of the last interlocking collar 14d, as well as the second end cap 20b may include teeth to allow the multi-element relationships to be sequentially constructed starting either from the first collar 14a, or the last collar 14d. Other embodiments of the present invention will be apparent to one of ordinary skill in the art. It is, therefore, intended that the claims set forth below not be limited to the embodiments described above.

What is claimed is:

1. An apparatus adaptable for use as a phrase-composing device, comprising a shaft comprising at first and second shaft sections, wherein the first and second shaft sections are each defined by at least two content areas disposed around the circumference of the shaft, wherein at least one of the content areas of each shaft section includes an element of a multi-element relationship;

a first collar slidable along and rotatable about the shaft, wherein the first collar includes teeth extending from a first edge thereof, and a gap selectively exposing one of the least two content areas of the first shaft section;

a second collar adjacent to the first collar and slidable along and rotatable about the shaft, wherein the second collar includes teeth extending from a first: edge thereof and configured to selectively interlock with the teeth extending from the first collar, wherein the second collar further includes a gap selectively exposing one of the least two content areas of the second shaft section;

wherein the content areas and the teeth of the first and second collars are configured such that the gaps in the first and second collars expose one content area of the first shaft section, and one content area of the second shaft section, respectively, when the teeth of the first collar and teeth of the second collar interlock.

2. The apparatus of claim 1 wherein the shaft is hollow.

3. The apparatus of claim 1 wherein the cross-sectional shape of the shaft is circular.

4. The apparatus of claim 1 wherein the cross-sectional shape of the shaft is elliptical.

5. The apparatus of caim 4 wherein the first and second collars are made of a flexible material.

6. The apparatus of claim 1 wherein the teeth extending from the first and second collars are arranged in a saw-tooth configuration.

7. The apparatus of claim 1 wherein the teeth are triangular in profile.

8. The apparatus of claim 1 wherein the elements in the content areas on the first and second shaft sections are alphanumeric characters.

9. The apparatus of claim 8 wherein the content areas are demarcated by lines.

10. The apparatus of claim 1 wherein the elements in the content areas are each a sentence fragment.

11. The apparatus of clain 1 wherein the content areas are demarcated by lines.

12. The apparatus of claim 1 wherein the gaps in the first and second collars are cutout sections of the collar.

13. The apparatus of claim 1 wherein the gaps in the first and second collars are transparent sections of the collar.

14. An apparaus adaptable for use as a phrase-composing device, comprising a shaft comprising at first and second shaft sections, wherein the first and second shaft sections are each defined by at least two content areas disposed around the circumference of the shaft, wherein at least one of the content areas of each shaft section includes an element of a multi-element relationship;

a first end cap attached to a first end of the shaft substantially adjacent to the first shaft section, wherein the first end cap includes first teeth extending from the inner edge thereof, a first collar slidable along and rotatable about the shaft, wherein the first collar includes second teeth extending from a first edge thereof and configured to selectively interlock with the first teeth extending from the first end cap, wherein the first collar includes third teeth extending from a second edge thereof, and wherein the first collar includes a gap selectively exposing one of the least two content areas of the first shaft section;

a second collar adjacent to the first collar and slidable along and rotatable about the shaft, wherein the second collar includes fourth teeth extending from a first edge thereof and configured to selectively interlock with the third teeth extending from the first collar, wherein the second collar further includes a gap selectively exposing one of the least two content areas of the second shaft section;

wherein the content areas and the teeth of the first and second collars are configured such that the gaps in the first and second collars expose one content area of the first shaft section, and one content area of the second shaft section, respectively, when the teeth of the first collar and teeth of the second collar interlock.

15. The apparatus of claim 14 further comprising a second end cap, wherein the first and second end caps confine the collars on the shaft.

16. The apparatus of claim 15 wherein the distance between the inner edges of the first and second caps permit sliding of the first and second collars and independent movement thereo.

17. The apparatus of claim 14 further comprising a third collar slidable along and rotatable about the shaft, wherein the third collar further includes a gap, and wherein the shaft further includes a third shaft section defined by at least two content areas disposed around the circumference thereof, wherein at least one of the content areas of the third shaft section includes an element of a multi-element relationship, wherein the at least a third collar includes teeth extending from a first edge thereof and configured to selectively interlock with an adjacent collar such that a selected content area on the third shaft section is viewable through the gap in the third collar.

18. The apparatus of claim 17 wherein the third collar includes teeth extending from a second edge thereof, the apparatus further comprising a fourth collar adjacent to the third collar and slidable along and rotatable about the shaft, wherein the fourth collar includes teeth from a first edge thereof and configured to slectively interlock with the teeth extending from the second edge of the third collar, wherein fourth collar further includes a gap, and wherein the shaft further includes a fourth shaft section defined by at least two content areas disposed around the circumference thereof, wherein at least one of the content areas of the fourth shaft section includes an element of a multi-element relationship, wherein the teeth of the fourth collar are configured to selectively interlock with the teeth of the third collar such that a selected content area on the fourth shaft section is viewable though the gap in the fourth collar.

19. The apparatus of claim 18 further comprising a second end cap located at the second end of the shaft substantially adjacent to the fourth shaft section and configured to retain the first, second, third and fourth collars on the shaft.

20. The apparatus of claim 19 wherein the distance between the inner edges of the first and second end caps are configured to allow the first, second, third and fourth collars to slide along the shaft and selectively permit independent rotation of the first, second, third and fourth collars about the shaft.

21. The apparatus of claim 14 wherein the teeth extending from the first and second collars are arranged in a saw-tooth configuration.

22. The apparatus of claim 14 wherein the teeth are triangular in profile.

23. The apparatus of claim 14 wherein the elments in the content areas on the first and second shaft sections are alphanumeric characters.

24. The apparatus of claim 14 wherein the elements in the content areas are each a sentence fragment.

25. The apparatus of claim 14 wherein the content areas are demarcated by lines.

26. The apparatus of claim 25 wherein the content areas are demarcated by lines.

27. The apparatus of claim 14 wherein the gaps in the first and second collars are cutout sections of the collar.

* * * * *

UNITED STATES PATENT AND TRADEMARK OFFICE
CERTIFICATE OF CORRECTION

PATENT NO. : 6,881,066 B1
DATED : April 19, 2005
INVENTOR(S) : Sarconi

It is certified that error appears in the above-identified patent and that said Letters Patent is hereby corrected as shown below:

Column 6,
Line 39, replace "caim" with -- claim --
Line 53, replace "clain" with -- claim --
Line 59, replace "apparaus" with -- apparatus --

Column 7,
Line 31, replace "thereo" with -- thereof --

Column 8,
Line 3, insert -- extending -- between "teeth" and "from"
Line 4, replace "slectively" with -- selectively --
Line 6, insert -- the -- before the first instance of the word "fouth"
Line 15, replace "though" with -- through --
Line 34, replace "elements" with -- elements --

Signed and Sealed this

Ninth Day of August, 2005

JON W. DUDAS
*Director of the United States Patent and Trademark Office*